United States Patent
Abhau et al.

(10) Patent No.: US 11,210,538 B2
(45) Date of Patent: Dec. 28, 2021

(54) VISUAL SURROUND VIEW SYSTEM FOR MONITORING VEHICLE INTERIORS

(71) Applicant: ZF Friedrichshafen AG, Friedrichshafen (DE)

(72) Inventors: Jochen Abhau, Bregenz (AT); Wolfgang Vieweger, Langenargen (DE)

(73) Assignee: ZF FRIEDRICHSHAFEN AG, Friedrichshafen (DE)

(*) Notice: Subject to any disclaimer, the term of this patent is extended or adjusted under 35 U.S.C. 154(b) by 124 days.

(21) Appl. No.: 16/288,888

(22) Filed: Feb. 28, 2019

(65) Prior Publication Data

US 2019/0279008 A1    Sep. 12, 2019

(30) Foreign Application Priority Data

Mar. 7, 2018 (DE) .......................... 102018203405.2

(51) Int. Cl.
| | |
|---|---|
| G06K 9/00 | (2006.01) |
| G06T 7/70 | (2017.01) |
| B60R 11/04 | (2006.01) |
| G06T 17/00 | (2006.01) |
| G06T 15/20 | (2011.01) |
| G06T 15/04 | (2011.01) |

(52) U.S. Cl.
CPC .......... *G06K 9/00832* (2013.01); *B60R 11/04* (2013.01); *G06T 7/70* (2017.01); *G06T 15/04* (2013.01); *G06T 15/205* (2013.01); *G06T 17/00* (2013.01); *G06T 2207/30268* (2013.01)

(58) Field of Classification Search
CPC ....... G06K 9/00832; G06T 7/70; G06T 15/04; G06T 15/205; G06T 17/00; G06T 2207/30268; B60R 11/04
See application file for complete search history.

(56) References Cited

U.S. PATENT DOCUMENTS

| | | | |
|---|---|---|---|
| 10,373,316 B2 * | 8/2019 | Costa ...................... G06T 7/194 |
| 2011/0115909 A1 * | 5/2011 | Sternberg .............. G01S 3/7864 |
| | | | 348/143 |
| 2015/0178884 A1 * | 6/2015 | Scholl ................... G06T 3/0018 |
| | | | 348/36 |
| 2016/0080699 A1 * | 3/2016 | Scholl ....................... B60R 1/00 |
| | | | 348/148 |
| 2018/0272977 A1 * | 9/2018 | Szawarski ................ B60N 2/04 |
| 2018/0329609 A1 * | 11/2018 | De Swarte ............. G06T 19/00 |
| 2019/0095733 A1 * | 3/2019 | Wang ...................... G06F 3/017 |
| 2019/0197325 A1 * | 6/2019 | Reiley .................... G08B 21/24 |

FOREIGN PATENT DOCUMENTS

| | | |
|---|---|---|
| DE | 4406906 A1 | 9/1995 |
| DE | 102015205507 B3 | 9/2016 |
| EP | 2511137 A1 | 10/2012 |

\* cited by examiner

*Primary Examiner* — Fayyaz Alam
(74) *Attorney, Agent, or Firm* — Crowell & Moring LLP

(57) ABSTRACT

A device comprising a processing unit (3) configured to project at least one camera image (Img1-Img8) from at least one camera (Cam1-Cam8) onto a virtual projection surface (Proj) in order to create a virtual image (ImgV) of the vehicle interior (2).

12 Claims, 8 Drawing Sheets

VISUAL SURROUND VIEW SYSTEM FOR MONITORING VEHICLE INTERIORS

RELATED APPLICATIONS

This application claims the benefit of priority under 35 U.S.C. § 119(a) of German Application No. 10 2018 203 405.2, filed Mar. 7, 2018, the content of which is incorporated herein by reference in its entirety.

FIELD

The present disclosure relates to the field of driver assistance systems, in particular a monitoring system for vehicle interiors.

DESCRIPTION OF RELATED ART

Driver assistance systems are electronic devices for motor vehicles in-tended to support the driver regarding safety aspects and to increase driving ease.

So-called awareness assistants (also referred to as "driver state detection systems" or "drowsiness detection systems") belong to driver assistance systems. Such awareness assistants comprise sensor systems for monitoring the driver, which follow the movements and eyes of the driver, for example, thus detecting drowsiness or distraction, and potentially issuing a warning signal.

There are also driver assistance systems that monitor the vehicle interior. In order for the person responsible for driving to be able to oversee the state of the vehicle interior, these systems have one or more cameras that monitor the interior. A system for monitoring a vehicle interior based on infrared beams is known form the German patent specification DE 4 406 906 A1.

Parking and maneuvering assistants for detecting the close proximity of the vehicle are also known. Parking and maneuvering assistants normally comprise a rear view camera. Modern parking and maneuvering assistants, also referred to as surround-view systems, also comprise, in addition to a rear view camera, other wide-angle cameras, e.g. on the front and sides of the vehicle. Such surround-view systems generate an image of the vehicle from a bird's eye view, thus from above. Such a surround-view system is known for example from the European patent application EP 2 511 137 A1.

When numerous cameras observe the exterior of the vehicle from numerous perspectives, and each individual camera image is displayed individually and unprocessed, this makes the information difficult for the driver to review and observe. The German patent specification DE 10 2015 205 507 B3 discloses a surround-view system for a vehicle in this regard, with numerous evaluation units for processing images recorded by numerous exterior cameras. The evaluation unit generates a bird's eye view from the recorded images by computing a projection of the recorded images onto a virtual projection surface, and by computing a bird's eye view of the projection onto the virtual projection surface.

SUMMARY

The object of the present invention is to create a driver assistance system that further increases the safety of the vehicle.

This object is achieved by the inventive device according to claim 1, the inventive monitoring system according to claim 9, and the inventive method according to claim 10. Further advantageous embodiments of the invention can be derived from the dependent claims and the following description of preferred exemplary embodiments of the present invention.

According to the exemplary embodiments described below, a device is created that comprises a processing unit configured to project at least one camera image from at least one camera onto a virtual projection surface, in order to create a virtual view of the vehicle interior.

The one or more cameras can be black-and-white or color cameras, stereo cameras, or time-of-flight cameras. The cameras preferably have wide-angle lenses. The cameras can be distributed, for example, such that every area of the vehicle interior lies within the perspective of at least one camera. Typical seating positions of the passengers can be taken into account, such that the passengers do not block certain views, or only block them to a minimal extent. The camera images are composed of numerous pixels, each of which define a grey value, a color value, or depth of field information.

The vehicle interior can be the entire vehicle interior, for example, or part of the vehicle interior, e.g. the loading region of a transporter, or the living area of a mobile home. The interior of larger vehicles, such as transporters, campers, and SUVs, as well as normal passenger cars is often difficult to see, and cannot be registered immediately, because of passengers, loads, luggage, etc. It is also difficult for the driver to oversee the interior while driving because he must pay attention to the street in front of him, and cannot look back. Furthermore, a child may become unbuckled from its safety belt during travel, and for this reason, it is not sufficient for the driver, or the person responsible for driving (in an autonomous vehicle), to examine the interior only once when commencing the drive. With an autonomous vehicle, as well as with larger vehicles, e.g. camper vehicles, loads or heavy objects might be moved by passengers during travel. As a result, hazards may arise during travel because someone is not buckled in, or loads are not correctly secured.

The virtual view or virtual image of the vehicle interior generated by means of the present invention can be transmitted from the processing unit to a display, for example, and displayed therein. The display can be a display screen, for example, located in the interior of the vehicle such that the driver can see it. The virtual image of the vehicle interior displayed on the display can assist the driver, for example, in checking whether all of the passengers have reached their seats and are buckled in, and whether there are dangerous objects in the vehicle interior.

The advantage of a virtual depiction of the interior on this manner is that the virtual camera can be placed at an arbitrary position, e.g. even outside the vehicle, or at positions that are difficult to access inside the vehicle, such that an image of the interior of the vehicle can be generated that provides a particularly comprehensive view thereof. With a virtual camera placed high above the vehicle, a bird's eye view of the vehicle interior can be generated, for example, like that from a camera with a telephoto lens, located above the vehicle interior, i.e. eliminating distortions that occur with wide-angle images recorded by cameras that are close to the object they are recording. In this manner, a virtual image of the vehicle interior can be obtained from a bird's eye view, providing the driver with clear view of the vehicle interior. By way of example, a potentially dangerous object on a table, or a child in the back who has become unbuckled, can be identified immediately. Furthermore, the images from numerous cameras are combined with his method to form a virtual image, thus improving the clarity for the driver.

The virtual image of the vehicle interior displayed on the monitor is generated in accordance with the exemplary embodiments described below, in that one or more camera images from respective cameras are projected onto a virtual projection surface.

The projection surface can be a model of the vehicle interior, for example, in particular a surface composed of numerous rectangular or polygonal surfaces, or curved surfaces, such as spheres and hemispheres, etc. thus representing a vehicle interior. The model of the vehicle interior serves as a projection surface for the camera image data. The projection surface does not necessary have to be a plane. Instead, the projection surface can be a two dimensional surface, for example, embedded in a three dimensional space. Rectangles or polygons, or curved surfaces that form 2D surfaces can be arranged at certain angles in relation to one another, such that the 2D surface represents a vehicle interior. The surfaces forming the projection surface can be interconnected, such that a uniform projection surface is formed. Alternatively, the projection surface can be composed of separate projection sub-surfaces, each of which is composed of one or more projection surfaces.

The projection of the a least one camera image can be obtained, for example, through virtual optical imaging processes, e.g. in that light beams from the respective pixels of the camera image intersect with the projection surface. By projecting one or more camera images, a 3D model of the vehicle interior is supplied with current camera data, such that the 3D model comprises current textures and color data.

The processing unit can be a processor or the like. The processing unit can be the central processing unit of an on-board computer of a vehicle, that can also assume other functions in the vehicle, in addition to generating a virtual image of the vehicle interior. The processing unit can also be a component, however, dedicated to generating a virtual image of the vehicle interior.

According to a preferred embodiment, the processing unit is configured to generate a virtual image of the image projected onto the virtual projection surface. A virtual image of the vehicle interior can be reconstructed from the camera images projected onto the virtual projection surface by means of virtual optical technologies. The virtual image can be generated, for example, in that the camera images projected onto the project surface are "photographed" by a virtual camera. This virtual photography can take place in turn by means of optical imaging processes, e.g. in that light beams from the respective pixels of the virtual camera image intersect with the projection surface. The processing unit can thus be configured, for example, to "film" a reconstructed 3D scenario of the vehicle interior recorded by a virtual camera (or a virtual observer) based on the camera images. Both the position and the orientation of this camera can be selected for this. By way of example, a virtual position in the center, above the vehicle, with a camera pointing straight down, or a virtual position somewhat to the side, with a diagonal orientation, can be selected. It is also possible for the user of the system to determine the position and orientation of the virtual camera himself, e.g. via a touchscreen.

The processing unit can also be configured to project numerous camera images from respective cameras onto the virtual projection surface, in order to create a composite virtual image. This can be accomplished in that the numerous camera images are combined to form a composite camera image by means of "stitching" technologies, known to the person skilled in the art, which is then projected onto the virtual projection surface. "Stitching" technologies can comprise alpha blending, for example, meaning that certain portions of pixel values are removed from the camera images. Alternatively, the camera images can be projected individually onto the projection surface, and these individual projections of the images can then be combined by means of the "stitching" technologies to form a composite projection, which is then "photographed" by the virtual camera. Alternatively, the camera images can be projected individually and "photographed," in order to then combine the virtual camera images by means of "stitching" technologies to obtain a virtual composite camera image.

The virtual projection surface can be derived from a model of the vehicle interior, in particular a 3D model of the vehicle interior. The model of the vehicle interior can comprise both static and temporary components of the vehicle interior. Thus, a current 3D model of the static (i.e. seats or tables, etc.) and moving or temporary components (passengers, luggage, etc.) can be generated from the images recorded by the camera during the runtime of the processing unit. The 3D model of the vehicle interior can comprise a collection of three dimensional coordinates, pixels, surfaces, or other geometric shapes.

The processing unit can also be configured to detect common features of an object in numerous camera images, in order to generate a 3D model of the vehicle interior. The detection of common features of an object can take place, for example, by correlating camera images with one another. A common feature can be a correlated pixel or correlated group of pixels, or certain structural or color patterns in the camera images. By way of example, camera images can be correlated with one another in order to identify correlating pixels or features, wherein the person skilled in the art can make use of known image correlating methods, such as those described by Olivier Faugeras et al. in the research paper "Real-time correlation-based stereo: algorithm, implementations and applications," RR-2013, INRIA 1993. By way of example, two camera images can be correlated with one another. In order to increase the precision of the reconstruction, more than two camera images can also be correlated with one another.

The processing unit can be configured to reconstruct the vehicle interior from current camera images using stereoscopic technologies. The generation of the 3D model can thus comprise a reconstruction of the three dimensional position of an object, e.g. a pixel or feature, by means of stereoscopic technologies. The 3D model of the vehicle interior obtained in this manner can be in the form of a collection of the three dimensional coordinates of all of the pixels identified in the correlation process. In addition, this collection of three dimensional points can also be approximated by surfaces in order to obtain a 3D model with surface areas.

The processing unit can also be configured to generate the model of the vehicle interior taking into account depth of field information, provided by at least one of the cameras. Such depth of field information is provided, for example, by stereoscopic cameras or time-of-flight cameras. Such cameras supply depth of field information for individual pixels, which can be referenced with the pixel coordinates in order to generate the model.

The model of the vehicle interior from which the projection surface is derived can be a predefined reference model of the vehicle interior, for example.

The processing unit can also be configured to combine such a predefined reference model of the vehicle interior with a model of the vehicle interior obtained from current stereoscopic camera images. The processing unit can be configured to create at least portions of the model of the vehicle interior taking the reference model into account. By way of example, the processing unit can recreate static or permanent components of the 3D model by detecting common features of an object in numerous images, taking into account an existing 3D reference model of the static or permanent vehicle interior. By way of example, a collection of three dimensional coordinates of pixels or other features identified in a correlation process can be compared with an existing 3D reference model of the vehicle interior, in order to determine where the objects currently in the vehicle interior correlate to or deviate from the 3D model.

A reference model of the vehicle interior comprises static components of the vehicle interior, for example, such as permanent objects in the vehicle interior. The 3D reference model can comprise seats, tables, interior walls, fixtures, etc. The reference model preferably also takes the vehicle interior into account resulting from rotating, moving, or tilting the seats and other static interior elements of the vehicle.

As a result, when a vehicle seat has been moved from a reference position or the backrest has been adjusted, this can be derived from a change in the three dimensional coordinates of a seat determined from the camera images.

The reference model can be stored in the processing unit, for example. As such, a reference model of the (permanent) vehicle interior, without loads and passengers, can be stored in a memory, e.g. a RAM, ROM, Flash, or SSD or hard disk memory of the processing unit for preparing and processing the individual camera images to form an overview comprising the entire interior.

The reference model can be generated in advance, for example in a calibration phase of an interior monitoring system, from camera images taken by the interior cameras. Alternatively, the reference model can also comprise 3D data regarding the vehicle interior, provided by the vehicle manufacturer, and stored in the processing unit. These can relate to structural details of a vehicle model known from the production process, such as grid models of interior components such as seats and fixtures, or grid models of vehicle walls and panels. The 3D reference model can also define colors and textures of surfaces, in order to obtain a particularly realistic model of the vehicle interior.

The exemplary embodiments described in greater detail below also disclose a monitoring system for a vehicle interior, comprising one or more cameras and a device, as described above, configured to create a virtual image of the vehicle interior based on one or more camera images from the cameras. The interior monitoring system can also comprise a communication system, via which the processing unit receives data from the interior cameras, for example, and transmits data, e.g. the generated virtual image of the vehicle interior, to the display device. The communication system can be a CAN bus for a motor vehicle, for example.

The exemplary embodiments described in greater detail below also relate to a method comprising the projection of at least one camera image from at least one camera onto a virtual projection surface, in order to create a virtual image of the vehicle interior. The method can comprise all of the processes that have been described above in conjunction with a processing unit or a monitoring system for a vehicle interior.

The methods described herein can also be executed as computer programs. The exemplary embodiments thus also relate to a computer program comprising instructions for projecting at least one camera image from at least one camera onto a virtual projection surface when the program is executed, in order to create a virtual image of the vehicle interior. The computer program can comprise all of the processes that have been described above in conjunction with a processing unit or a monitoring system for a vehicle interior. The computer program can be stored in a memory, for example.

BRIEF DESCRIPTION OF THE DRAWINGS

Embodiments are described only by way of example and in reference to the attached drawings, in which.

DETAILED DESCRIPTION

Figure 1:
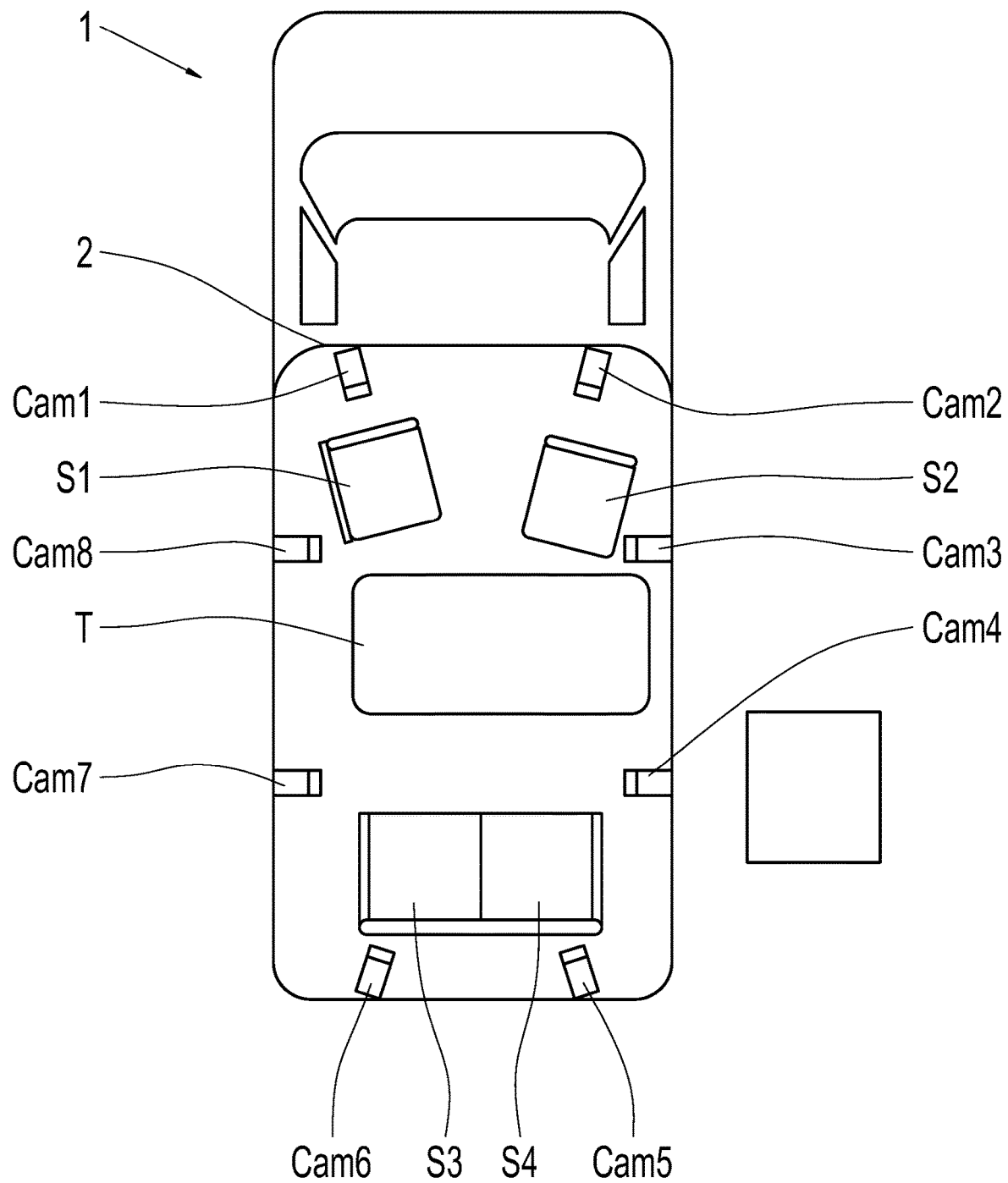
FIG. 1 shows a schematic top view of a vehicle equipped with an interior monitoring system.

FIG. 1 shows a schematic bird's eye view of a vehicle 1, in this case a mobile home, by way of example, equipped with an interior monitoring system. The interior monitoring system comprises an exemplary arrangement of interior cameras Cam1-Cam8. Two of the interior cameras Cam1, Cam2 are located at the front end of the vehicle interior 2, two of the cameras Cam3, Cam4 are located on the right side of the vehicle interior 2, two interior cameras Cam5, Cam6 are located at the back end of the vehicle interior 2, and two interior cameras Cam7, Cam8 are located on the left side of the vehicle interior 2. Each interior camera Cam1-Cam8 records a portion of the interior 2 of the vehicle 1. The exemplary equipping of the vehicle 1 with interior cameras is configured such that the interior cameras Cam1-Cam8 can observe the entire vehicle interior when more people are in the vehicle. Furthermore, the permanent interior fittings of the vehicle interior include four seats S1-4 and a table T. The cameras can be black-and-white or color cameras with wide angle lenses, for example.

Figure 2:
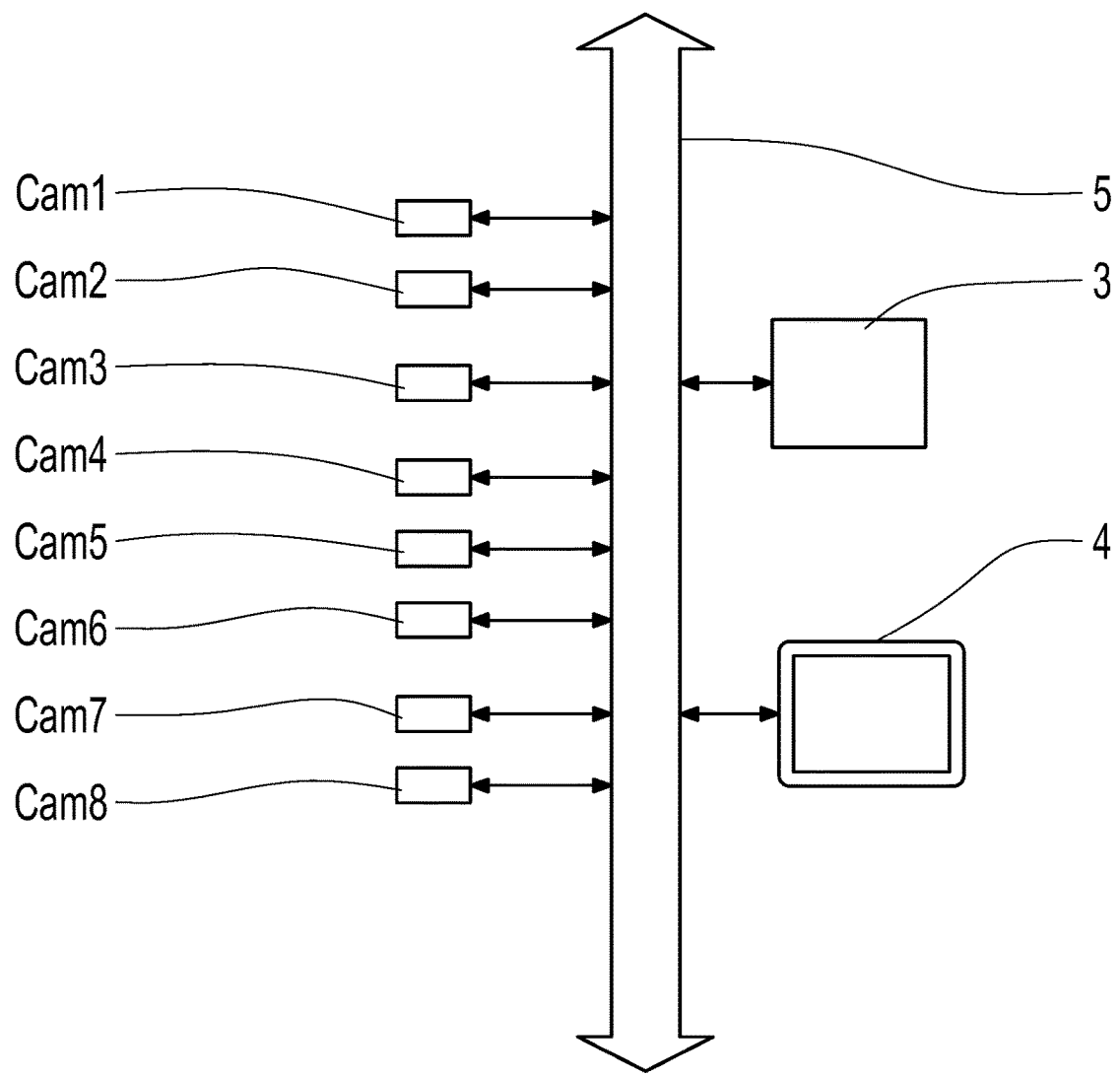
FIG. 2 shows a block diagram of the interior monitoring system.
Figure 3:
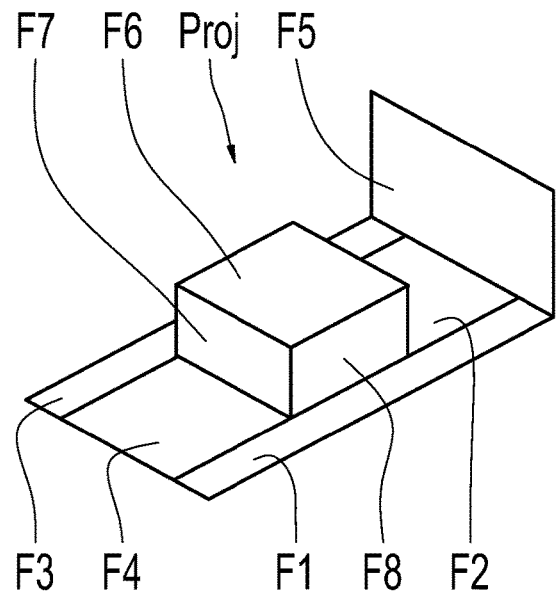
FIG. 3 shows a schematic example of a virtual projection surface.
Figure 4:
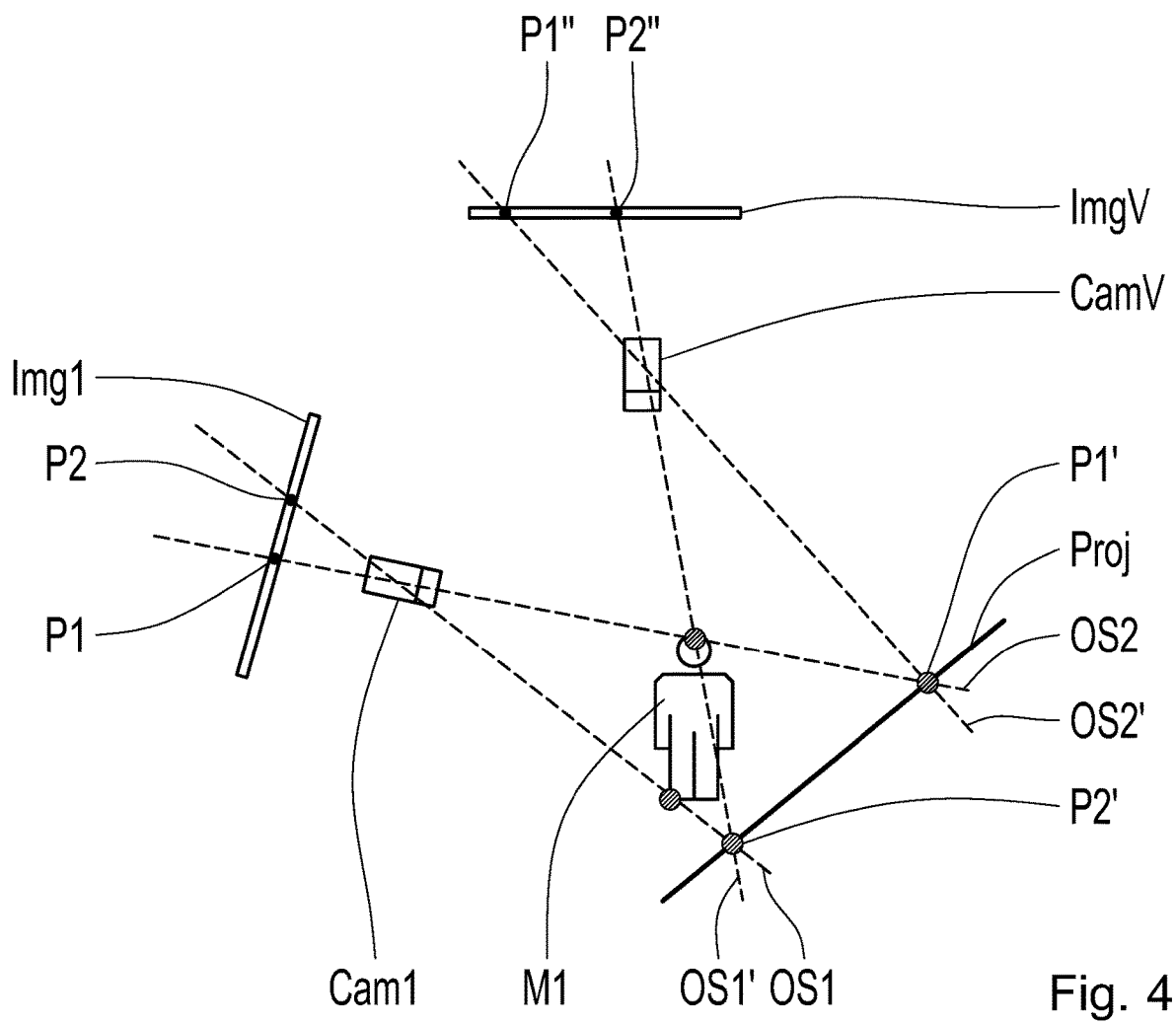
FIG. 4 shows an exemplary process for projecting a camera image onto a virtual projection surface.

FIG. 2 shows a block diagram, schematically illustrating the interior monitoring system. In addition to the cameras Cam1-Cam8, the interior monitoring system comprises a processing unit 3 and a display 4. The images recorded by the various cameras Cam1-Cam8 are transmitted via a communication system 5 (e.g. a CAN bus) to the processing unit 3 for processing in the processing unit 3. The processing unit 3 is configured to correlate camera images in order to generate a 3D model of the interior, as is shown in FIGS. 3, 4, and 5, and shall be explained in greater detail below. The processing unit 3 then recreates a bird's eye view of the vehicle interior 2. The reproduction of the bird's eye view is then shown on the display 4, which is located inside the vehicle 1 where it can be seen by a driver. The vehicle 1 can be a mobile home, for example. The bird's eye view shown on the display 4 can help the driver check whether all of the passengers have taken seats, and are buckled in, and whether there are any dangerous objects in the vehicle interior.

FIG. 3 shows a schematic example of a virtual projection surface derived from a 3D model of the vehicle interior. The projection surface comprises surfaces F1, F2, F3, F4 of a 3D model of the vehicle interior, representing a floor of the vehicle interior. Furthermore, the projection surface comprises a surface F5 of a 3D model of the vehicle interior that represents a side wall of the vehicle interior, as well as surfaces F6, F7, F8 of a 3D model of the vehicle interior that represent a table in the vehicle interior. A portion of the projection surface Proj, or the model of the vehicle interior, is shown in FIG. 3. The surfaces F1 to F8 are combined to form a (two dimensional) projection surface Proj of the vehicle interior, which can be used as a virtual projection surface for camera images, as shall be explained in greater detail in reference to FIG. 4. Such a (two dimensional) projection surface of the vehicle interior can be defined manually, for example, and stored in a memory in the processing unit as a reference model. Alternatively, such a 2D projection surface can also be derived or reconstructed from a 3D CAD model of the vehicle interior, as is obtained from a construction processes for the vehicle. Alternatively, a projection surface of the vehicle interior can also be obtained with stereoscopic methods, as shall be explained in reference to FIGS. 5a, 5b, 6, and 7 in greater detail below. By way of example, a collection of 3D points can be determined with stereoscopic methods that represent a 2D surface of the vehicle interior, as is shown, for example, in the aforementioned article by Olivier Faugeras et al. in the research report, "Real-time correlation-based stereo: algorithm, implementations and applications," RR-2013, INRIA 1993. In particular, the projection surface Proj can also be derived from a composite model, which is generated by combining a predefined reference model with a current, reconstructed model, as shall be explained in greater detail below in reference to FIG. 5.

FIG. 4 shows an exemplary process for projecting a camera image Img1 onto a virtual projection surface Proj. The virtual projection surface Proj can be one or more of the surfaces F1 to F8 shown in FIG. 3. The projection surface Proj represents a model of the vehicle interior, defining a two dimensional surface embedded in a three dimensional space, not yet containing any textural or color information. A light beam OS1 or OS2 is calculated for each pixel P1, P2 of the camera image Img1 from the known position and orientation of the camera Cam1, and the likewise known position and orientation of the image plane of the camera image Img1. The pixels P1 and P2 correspond to the image of a passenger M1 in the vehicle interior generated by the camera Cam 1. The intersection of the two light beams OS1 and OS2 with the virtual projection surface Proj produces projections P1' and P2' of the pixels P1 and P2. A model of the vehicle interior is composed of these projections of the camera image that defines a two dimensional surface containing textural and color information. By computing the light beams OS1' and OS2' through these projections P1' and P2' with respect to a virtual camera CamV, virtual images P1" and P2" of points P1 and P2 can be obtained in a virtual image plane ImgV of the virtual camera CamV. When this process is carried out for all of the pixels of the camera image Img1, a virtual image ImgV of the portion of the vehicle interior recorded by the camera Cam1 can be generated on the virtual projection surface Proj from the perspective of the virtual camera CamV.

The process shown in FIG. 4 can be carried out for all of the surfaces of the vehicle interior model (e.g. F1 to F8 in FIG. 3) in order to generate a projection of the camera image Img1 on the 2D surface of the vehicle interior. The virtual image plane ImgV and the virtual camera CamV are used for computing a view of the scenario, as would only be possible in reality from an observation point located far above the vehicle.

The process shown in FIG. 4 can furthermore be carried out for camera images from numerous, or all, of the interior cameras (e.g. Cam1 to Cam8 in FIG. 1 and FIG. 2), in order to obtain a complete image of the vehicle interior. If numerous cameras are used, positioned on different sides of the vehicle, as shown in FIG. 1, numerous camera images are recorded simultaneously, resulting in numerous images calculated for the virtual observer represented by the virtual camera ImgV. For this reason, the processing unit 3 is also configured to combine the numerous images to form a single, seamlessly composed bird's eye view, which is then shown in the display 4. Alternatively, the processing unit 3 can be configured to combine numerous images to form a composite image by means of technologies known to the person skilled in the art as "stitching." The projection onto the projection surface, as well as the bird's eye view, can be calculated based on the individual composite images. Another alternative is that the processing unit 3 is configured to combine numerous projection images of the recorded images to form a single projection image on the virtual projection surface by means of "stitching" technologies, and then compute a bird's eye view based on this single projection image.

Figure 5A:
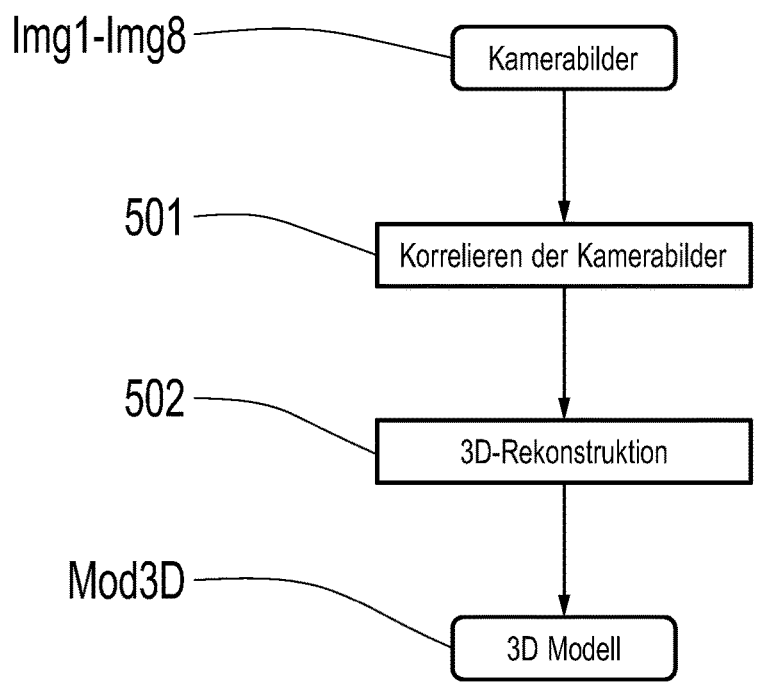
FIG. 5a shows a flow chart for a process for generating a model of the vehicle interior from numerous camera images of the vehicle interior.

FIG. 5a shows a flow chart for a process for generating a model of the vehicle interior from numerous camera images of the vehicle interior. The process can be carried out in the processing unit (3 in FIG. 2), for example. In step 501, camera images Img1-Img8 recorded by the interior cameras (Cam1 to Cam8 in FIGS. 1 and 2) are correlated with one another in order to identify correlating pixels in the camera images Img1-Img8. In step 502, a 3D model Mod3D of the vehicle interior is reconstructed from the information obtained in step 501 regarding correlating pixels.

Figure 5B:
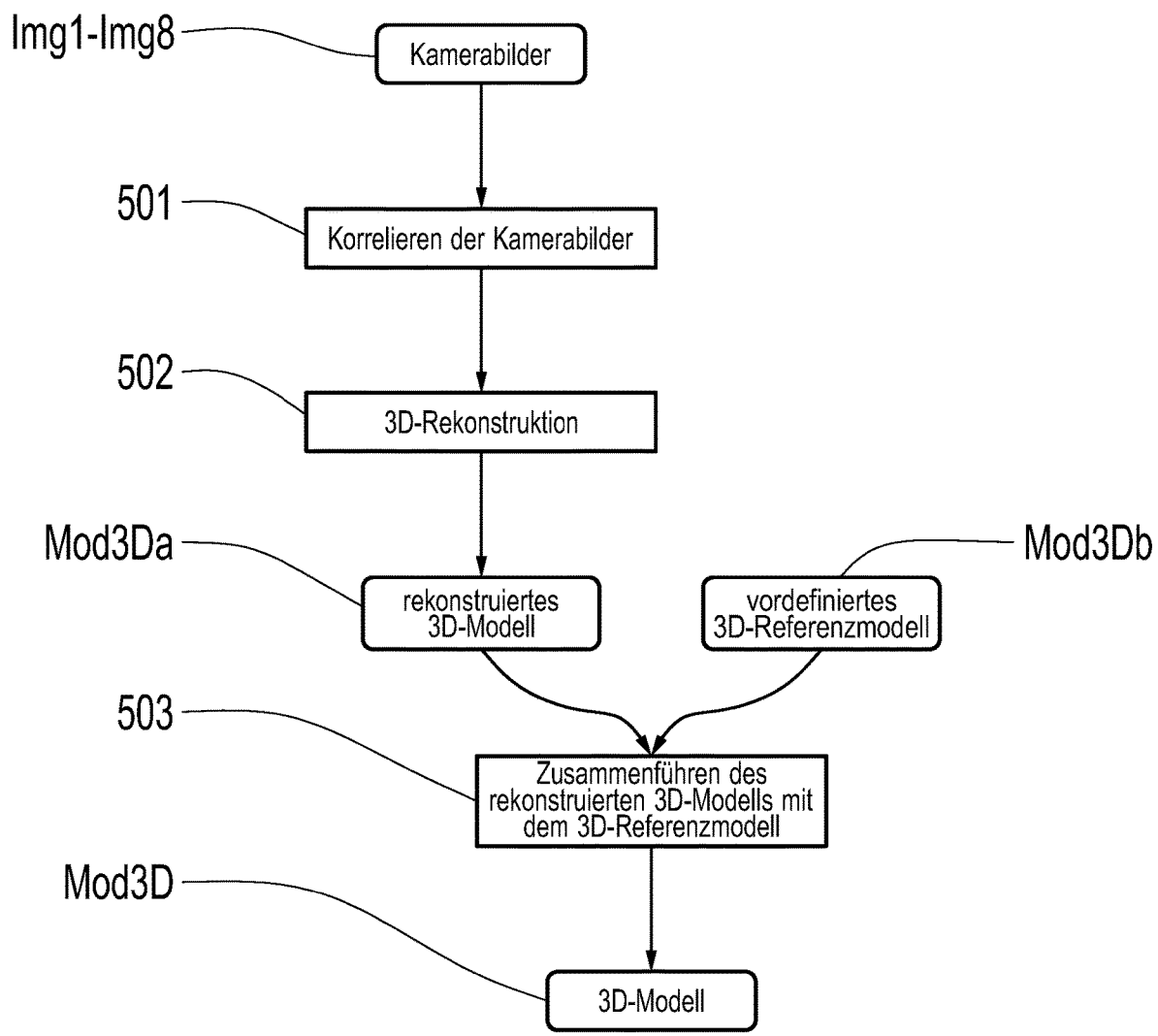
FIG. 5b shows a flow chart for an alternative process for generating a model of the vehicle interior from numerous camera images of the vehicle interior.

FIG. 5b shows a flow chart for an alternative process for generating a model of the vehicle interior from numerous camera images of the vehicle interior and an existing model of the vehicle interior. The process can be carried out in the processing unit (3 in FIG. 2), for example. In step 501, camera images Img1-Img8 recorded by the interior cameras (Cam1-8 in FIGS. 1 and 2) are correlated with one another in order to identify correlating pixels in the camera images Img1-Img8. In step 502, a 3D model Mod3Da of the vehicle interior is reconstructed from the information obtained in step 501 regarding correlating pixels. In step 503, the reconstructed model Mod3Da is combined with a predefined 3D reference model Mod3Db of the vehicle interior (e.g. with a 3D-CAD model obtained from the assembly process for the vehicle) in order to obtain a definitive 3D model Mod3D of the vehicle interior. The combining of the reconstructed model with the reference model can comprise the detection of objects that have been displaced with respect to the reference model, as shall be explained in greater detail below in reference to FIG. 8. Additionally or alternatively, the combining of the reconstructed model with the reference model can also comprise a detection of additional objects that are not contained in the reference model, e.g. luggage or passengers in the vehicle interior. By combining the 3D reference model with the reconstructed model, a better model is obtained because not only reference data, but also current data regarding surfaces or objects in the vehicle interior, can be taken into account.

Figure 6:
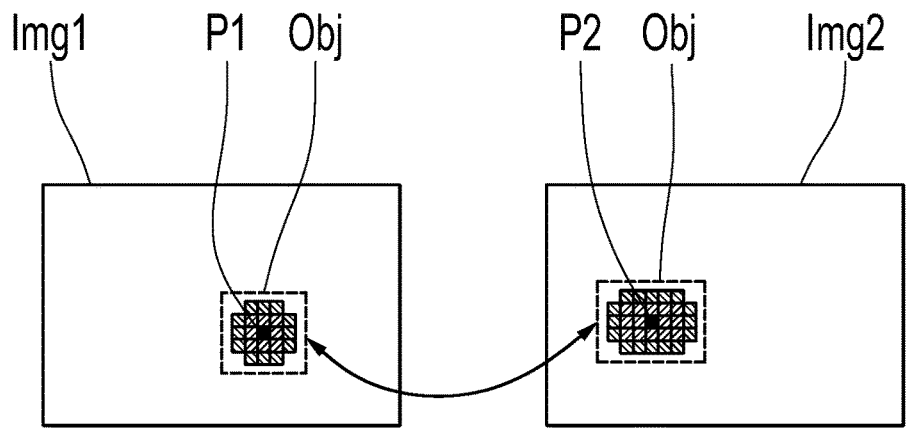
FIG. 6 shows a process for correlating two camera images, in order to identify correlating pixels.

FIG. 6 shows, by way of example, a process for correlating two camera images in order to identify correlating pixels. Two interior cameras with known positions and orientations provide a first camera image Img1 and a second camera image Img2. These can be camera images Img1 and Img2 from the two interior cameras Cam1 and Cam2 in FIG. 1. The positions and orientations of the two cameras are different, such that the two camera images Img1 and Img2 show an exemplary object Obj from two different perspectives. Each of the camera images Img1 and Img2 are composed of individual pixels corresponding to the resolution and depth of color of the camera. The two camera images Img1 and Img2 are correlated with one another in order to identify correlating pixels, wherein the person skilled in the art can make use of known image correlation methods such as those specified above. It is determined in the correlation process that an object Obj is recorded in camera image Img1 and in camera image Img2, and that pixel P1 in camera image Img1 correlates to pixel P2 in camera image Img2. The position of the object Obj in camera image Img1 differs from the position of the object Obj in camera image Img2 due to the different camera positions and orientations. The form of the camera image of the object Obj in the second camera image likewise differs from the form of the image of the object in the first camera image due to the different perspective. The position of the pixel in three dimensional space can be determined from the different positions of the pixel P1 in image Img1 in comparison with pixel P2 in image Img2 by means of stereoscopic technologies (cf. FIG. 7 and the description below). As a result, the correlation process provides the positions of numerous pixels from objects in the vehicle interior, from which a 3D model of the vehicle interior can be reconstructed.

Figure 7:
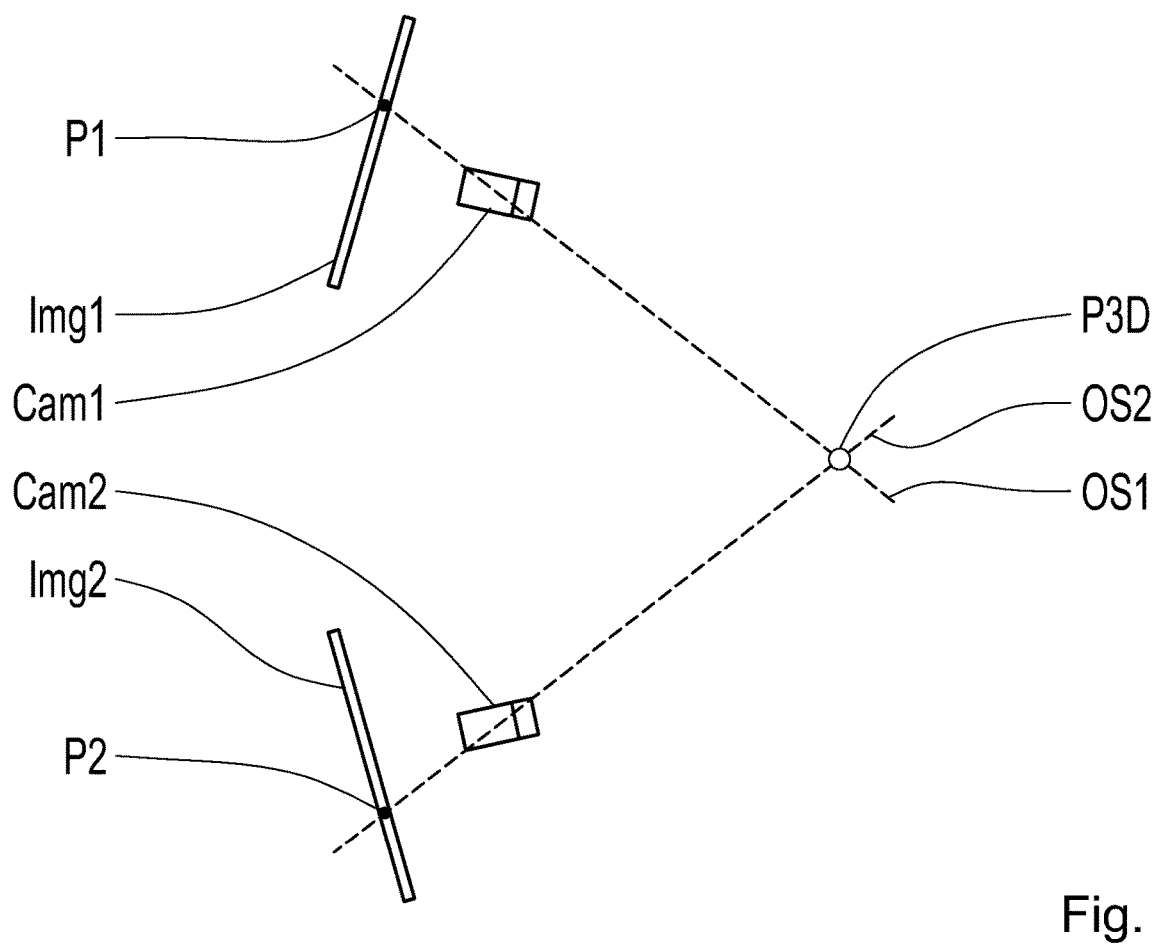
FIG. 7 shows an exemplary process for reconstructing the three dimensional position of a pixel by means of stereoscopic technologies.

FIG. 7 shows an exemplary process for reconstructing the three dimensional position of a pixel by means of stereoscopic technologies. A light beam OS1 and OS2 is computed for each pixel P1, P2 from the known positions and orientations of the two cameras Cam1 and Cam2, and the likewise known positions and orientations of the image planes of the camera images Img1 and Img2. The intersection of the two light beams OS1 and OS2 provides the three dimensional positions P3D of the pixels forming the pixels P1 and P2 in the two camera images Img1 and Img2. Two camera images are evaluated in the exemplary process shown in FIG. 7, in order to determine the three dimensional position of two correlated pixels. In this manner, the images from individual pairs of cameras Cam1/Cam2, Cam3/Cam4, Cam5/Cam6, or Cam7/Cam8, can be correlated with one another in order to generate the 3D model. In order to increase the reconstruction precision, numerous camera images can be correlated with one another. If three or more camera images are to be correlated with one another, a first camera image can be selected as the reference image, in relation to which a disparity chart is calculated for each of the other camera images. The disparity charts are then combined in that the correlation with the best results is selected.

The model of the vehicle interior obtained in this manner can be regarded as a collection of the three dimensional coordinates of all of the pixels identified in the correlation process. Furthermore, this collection of three dimensional points can also be approximated by surfaces, in order to obtain a model with surfaces. The collection of three dimensional coordinates of all of the pixels identified in the correlation process can also be compared with an existing reference model of the vehicle interior, in order to determine correlations and deviations of the current objects in the vehicle interior to the reference model.

Figure 8:
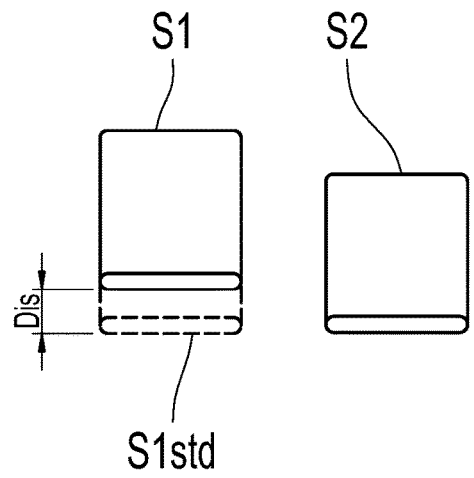
FIG. 8 shows a schematic example of the comparison of a collection of three dimensional coordinates of pixels identified in the correlation process with a 3D reference model.

FIG. 8 shows an example in which two vehicle seats S1 and S2 defined in the reference model are identified by comparing the collection of three dimensional coordinates of pixels identified in the correlation process with the reference model. A displacement Dis of the vehicle seat S1 from its standard position S1sdt can be detected from the deviations of the three dimensional coordinates S1 of the first seat from the camera images. In the same manner, an adjustment of the backrests of seats S1 and S2 from their standard tilt can also be detected.

Figure 9:
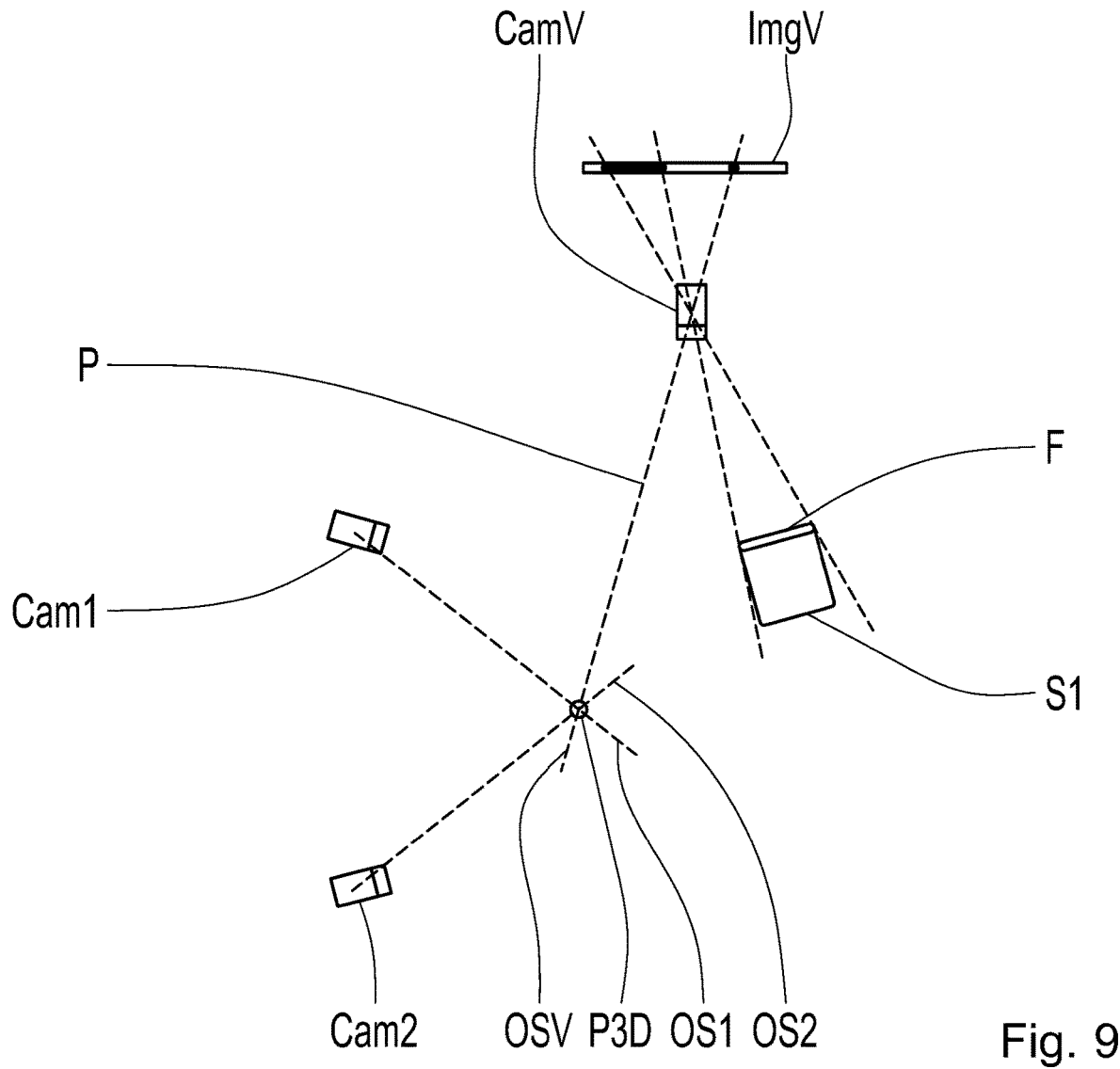
FIG. 9 shows how an image of a 3D model of the vehicle interior can be obtained by means of a virtual camera.

FIG. 9 shows how an image of a model of the vehicle interior can be obtained by means of a virtual camera CamV. The image can be shown to the driver, for example, such that said driver can easily see that the vehicle interior is in a safe state. As explained in reference to FIG. 7, a three dimensional position P3D of a point of an object in the vehicle interior can be reconstructed from two images recorded by two cameras Cam1 and Cam2 by means of stereoscopic technologies. The color data of the pixel is projected onto this point. By calculating the light beam from this point and the virtual camera CamV, a virtual image P of the point P3D can be determined in a virtual image plane ImgV of the virtual camera CamV. The virtual image plane ImgV and the virtual camera CamV are used to calculate a view of the scenario ("photograph"), which would only be possible in reality from an observation point located high above the vehicle. In that this process is carried out for all of the pixels identified in the correlation process, a virtual image ImgV of the model of the vehicle interior can be generated with the color information from the actual cameras projected thereon from the perspective of the virtual camera CamV. As is likewise shown in FIG. 9, a surface F of a seat S1 detected in the model estimated from the collection of three dimensional points can be photographed on the image plane ImgV of the virtual camera CamV. The seat S1 and the reconstructed point P3D represent a portion of a 3D model or a projection surface, by way of example, onto which textural and color information from the physical cameras is projected. In this manner, a virtual image of the vehicle interior from a bird's eye view can be obtained, providing the driver with a clear overview of the vehicle interior.

Figure 10:
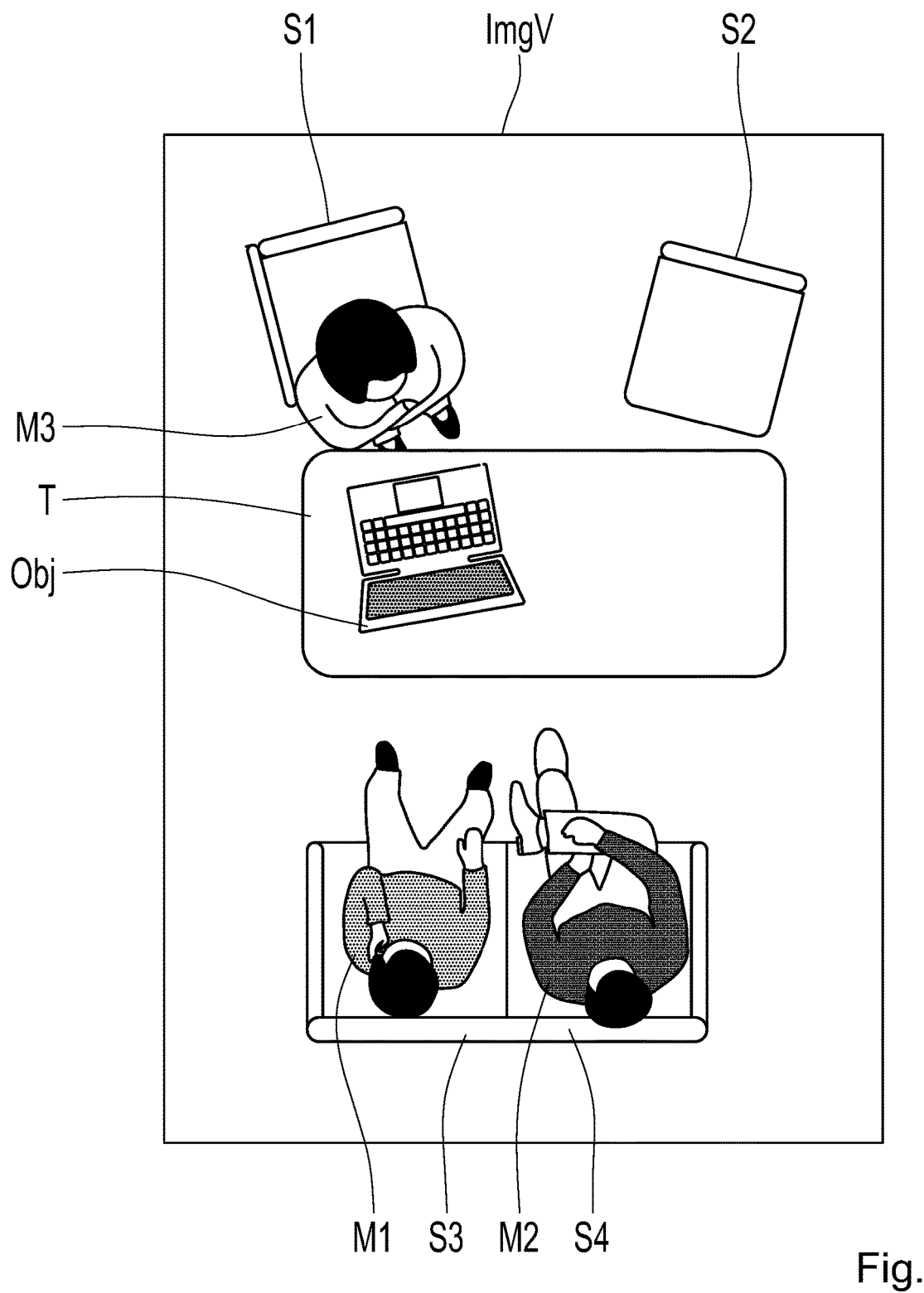
FIG. 10 shows an example of a virtual image of the vehicle interior from a bird's eye view.

FIG. 10 shows an example of a virtual image ImgV of the vehicle interior from a bird's eye view, such as would be obtained from the method described above. The image ImgV of the vehicle interior is determined, for example, from eight cameras in the vehicle interior, as described in reference to FIG. 1. A model of the vehicle interior is generated from the correlation of the camera images in accordance with the process described in reference to FIG. 6 and FIG. 7, which is then "photographed" by a virtual camera (CamV in FIG. 7) in accordance with the process shown in FIG. 9. The 3D model constructed from the camera images comprises points, surfaces, or other geometric shapes belonging to seats S1, S2, S3, and S4 in the vehicle interior. These seats S1-S4 can be detected through a comparison with a 3D reference model of the vehicle interior, even if the seats S1-S4 are partially or entirely blocked from the individual cameras by people M1, M2, M3 or other objects in the vehicle interior. The 3D model constructed from the images also comprises points, surfaces, or other geometric shapes, that describe a table T, as well as points, surfaces, or other geometric shapes, that describe people M1, M2, M3 in the vehicle interior. The virtual image ImgV of the 3D model of the vehicle interior shows the driver that the person M3 has stood up, in violation of the safety guidelines, while the vehicle is in motion, and is consequently not buckled into the seat S1. The virtual image ImgV of the vehicle interior also shows the driver that there is an object Obj on the table T that is not secured, which could fly around in the vehicle interior if the brakes were applied suddenly in the vehicle, thus jeopardizing the safety of the people M1, M2, M3 in the vehicle interior. The image ImgV of the vehicle interior in FIG. 10 illustrates a possible image of the vehicle interior from above, that could not be taken by an actual camera (Cam1-8 in FIG. 1) due to the perspective. The computed image from the camera system can be displayed on any display screen or on an app on a smartphone.

Both color and black-and-white cameras are used in the exemplary embodiments explained above, in order to obtain recordings of the vehicle interior. Alternatively or additionally, time-of-flight cameras or stereo cameras can also be used. These cameras also provide additional depth of field information for the object being recorded, such that the 3D model of the interior can be more easily and robustly obtained in the run-time of the system, without requiring any feature points. Simple black-and-white or color cameras, however, are typically less expensive than time-of-flight or stereo cameras.

REFERENCE SYMBOLS 1 vehicle
2 vehicle interior
3 processing unit
4 display
5 communication system
Cam1-Cam8 interior cameras
S1-S4 seats
S1std reference position of first seat
Dis displacement of seat
T table
Img1-Img8 camera images
Mod3D 3D model of vehicle interior
Mod3Da reconstructed 3D mode of vehicle interior
Mod3Db predefined 3D model of vehicle interior
Obj object in vehicle interior
P1, P2 pixels in camera images
P1', P2' projected pixels of camera images
P1", P2" virtual images of projected pixels
P3D reconstructed three dimensional position
OS1, OS2 light beams regarding first and second cameras
OS2' light beams regarding virtual cameras
OSV light beam regarding virtual camera
CamV virtual camera
ImgV virtual image
Proj virtual projection surface
F1-F8 exemplary surfaces of a vehicle interior
F surface on first seat
M1, M2, M3 people in vehicle interior

We claim:

1. A device comprising a processing unit configured to project at least two camera images from at least two cameras onto a virtual projection surface to obtain a virtual image of the vehicle interior,
    wherein the virtual projection surface is derived from a model of the vehicle interior, and
    wherein the processing unit is configured to:
        correlate the at least two camera images with one another in order to identify correlating pixels in the at least two camera images, wherein the correlating pixels in each of the at least two camera images correspond to an object present in each of the at least two camera images, and
        reconstruct the model of the vehicle interior from the information obtained regarding correlating pixels,
    wherein the processing unit is further configured to at least one of:
        reconstruct the model of the vehicle interior from the at least two camera images by means of stereoscopic technologies, or
        combine a predefined reference model of the vehicle interior with a model of the vehicle interior obtained from the at least two camera images by means of stereoscopic technologies and combine the reconstructed model of the vehicle interior with the predefined reference model of the vehicle interior in order to obtain a definitive model of the vehicle interior.

2. The device according to claim 1, wherein the processing unit is configured to generate a virtual image of the at least two camera images projected onto the virtual projection surface.

3. The device according to claim 1, wherein the processing unit is configured to project the at least two camera images from the at least two cameras onto the virtual projection surface in order to create a composite virtual image of the vehicle interior.

4. The device according to claim 1, wherein the model of the vehicle interior is a predefined reference model of the vehicle interior.

5. The device according to claim 4, wherein the processing unit is configured to detect common features of the object in numerous camera images in order to reconstruct a model of the vehicle interior.

6. A monitoring system for a vehicle interior comprising the at least two cameras and the device according to claim 1, configured to create a virtual image of the vehicle interior based on the at least two camera images from the at least two cameras.

7. A method, comprising:
    the projection of at least two camera images of at least two cameras onto a virtual projection surface in order to create a virtual image of the vehicle interior,
    wherein the virtual projection surface is derived from a model of the vehicle interior,
    wherein the at least two camera images are correlated with one another in order to identify correlating pixels in the at least two camera images, wherein the correlating pixels in each of the at least two camera images correspond to an object present in each of the at least two camera images, and
    wherein the model of the vehicle interior is reconstructed from the information obtained regarding correlating pixels, the method further comprising at least one of:
  the reconstruction of the model of the vehicle interior from the at least two camera images by means of stereoscopic technologies, or
  the combination of a predefined reference model of the vehicle interior with a model of the vehicle interior obtained from the at least two camera images by means of stereoscopic technologies, wherein the reconstructed model of the vehicle interior is combined with the predefined reference model of the vehicle interior in order to obtain a definitive model of the vehicle interior.

8. The method according to claim 7, further comprising detecting common features of the object in numerous camera images in order to reconstruct a model of the vehicle interior.

9. A monitoring system for a vehicle interior comprising the at least two cameras and the device according to claim 2, configured to create a virtual image of the vehicle interior based on the at least two camera images from the at least two cameras.

10. A monitoring system for a vehicle interior comprising the at least two cameras and the device according to claim 3, configured to create a virtual image of the vehicle interior based on the at least two camera images from the at least two cameras.

11. A monitoring system for a vehicle interior comprising the at least two cameras and the device according to claim 4, configured to create a virtual image of the vehicle interior based on the at least two camera images from the at least two cameras.

12. A monitoring system for a vehicle interior comprising the at least two cameras and the device according to claim 5, configured to create a virtual image of the vehicle interior based on the at least two camera images from the at least two cameras.

* * * * *